(12) United States Patent
Todasco et al.

(10) Patent No.: US 9,872,140 B2
(45) Date of Patent: Jan. 16, 2018

(54) SOCIAL NETWORKING CONNECTIONS THROUGH SHORT RANGE WIRELESS DEVICES

(71) Applicant: PAYPAL, INC., San Jose, CA (US)

(72) Inventors: Michael Charles Todasco, Santa Clara, CA (US); Christina Marie Todasco, Santa Clara, CA (US)

(73) Assignee: PAYPAL, INC., San Jose, CA (US)

( * ) Notice: Subject to any disclaimer, the term of this patent is extended or adjusted under 35 U.S.C. 154(b) by 65 days.

(21) Appl. No.: 14/616,549

(22) Filed: Feb. 6, 2015

(65) Prior Publication Data
US 2016/0234641 A1    Aug. 11, 2016

(51) Int. Cl.
*H04W 24/00*    (2009.01)
*H04W 4/02*    (2009.01)
*H04L 29/12*    (2006.01)

(52) U.S. Cl.
CPC ......... *H04W 4/023* (2013.01); *H04L 61/1594* (2013.01)

(58) Field of Classification Search
None
See application file for complete search history.

(56) References Cited

U.S. PATENT DOCUMENTS

| | | | |
|---|---|---|---|
| 2014/0099920 A1* | 4/2014 | Belanger | H04W 4/021 455/411 |
| 2015/0245184 A1* | 8/2015 | Govande | H04M 3/543 455/417 |
| 2016/0014677 A1* | 1/2016 | Chen | H04W 48/16 455/434 |
| 2016/0165002 A1* | 6/2016 | LeBeau | H04L 67/306 709/204 |

* cited by examiner

*Primary Examiner* — Idowu O Osifade
(74) *Attorney, Agent, or Firm* — Haynes and Boone, LLP

(57) ABSTRACT

There are provided systems and methods for social networking connections through short range wireless devices. A user may become associated with a new location based on one or more connections made by the user's communication device and a device at the location, such as a communication device of another user at the location or a wireless beacon established at the location. The user may previous have been associated with another location, such as a previous workplace, apartment building, or other commonplace for users. Once the user is associated with the new location, other nearby users associated with that location may be determined. The nearby users may be detected using similar devices at the location or may provide information that associates them with the location. Using social networking connections between the user and nearby users, the users may receive contact recommendations proposing new social networking connections between the users.

20 Claims, 5 Drawing Sheets

SOCIAL NETWORKING CONNECTIONS THROUGH SHORT RANGE WIRELESS DEVICES

TECHNICAL FIELD

The present application generally relates to social networking connections through short range wireless devices and more specifically to using a connection between a communication device in possession of a user to determine whether the user is associated with a new location and new users to provide proposed social networking connections.

BACKGROUND

Users may utilize social networking services to connect to other users. Often, these social networking services provide recommendations for connections with other users that a first user may wish to connect with, such as friends of one or more mutual friends, people with similar addresses or businesses, and/or past school or business contacts. However, as users move to new locations and new jobs, the social networking services may be slow to update their recommendations without the user providing new information associating them with a new location. For example, a new hire at a business may not immediately add present employees at the business or may not update their profile to include the business's name or address. However, the new hire may wish to connect with the present employees in order to familiarize themselves with the current staff. Thus, the new hire may miss out on a valuable resource provided by the social networking service.

Figure 1:
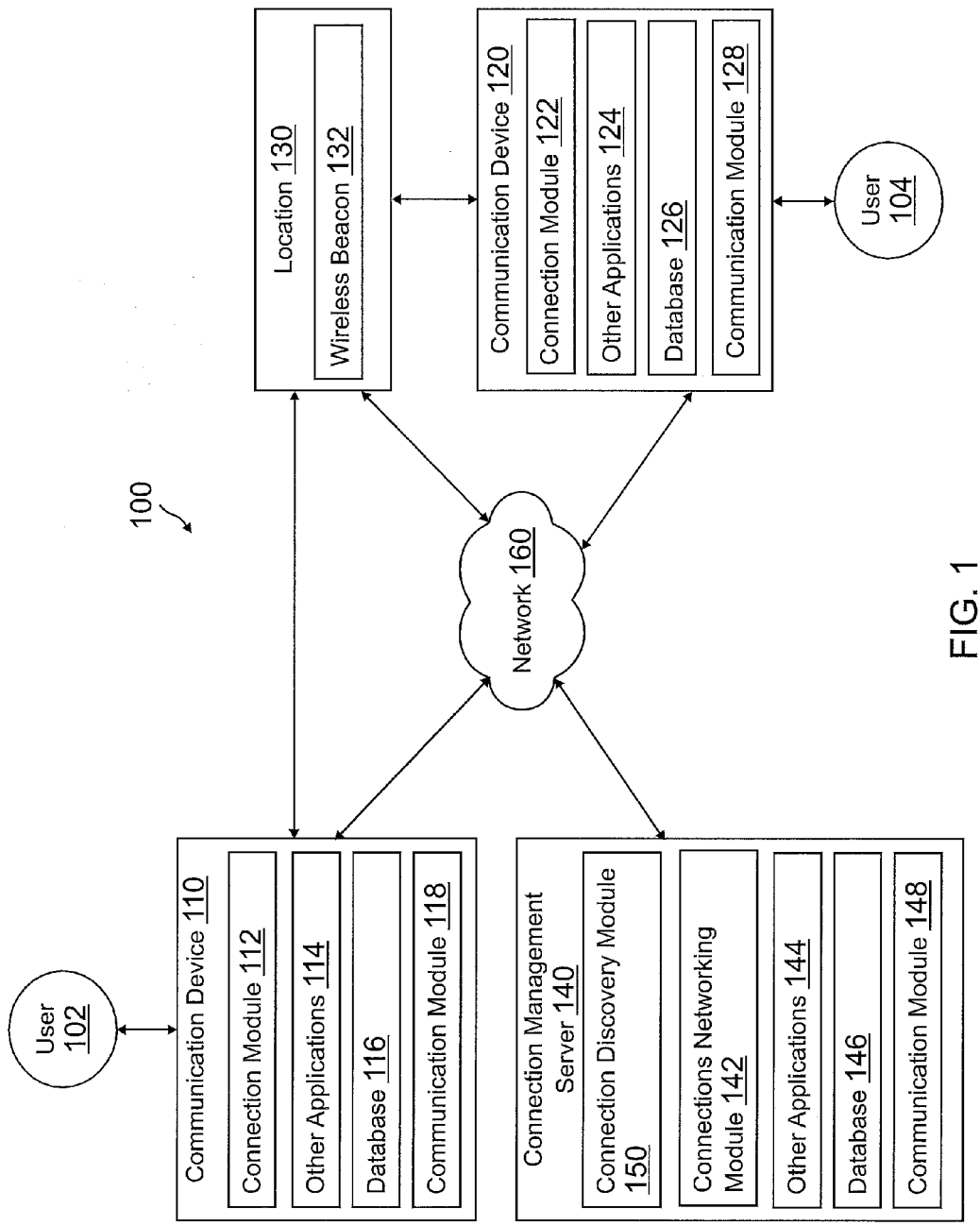
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods for social networking connections through short range wireless devices. Systems suitable for practicing methods of the present disclosure are also provided.

A user may visit a new location with a communication device, such as a mobile phone, tablet computer, wearable computing device, laptop, or other type of communication device. The new location may be a location the user has visited only on one occasion or may visited on multiple recent occasions, for example, a new place of business, a new residence or apartment/condo location, a new gym, a new restaurant or other merchant location, or other type of location. The location may include one or more devices that may connect with the user's communication device. For example, the devices may be wireless beacons that emit signals receivable by the communication device and allow for connections with the communication device when the communication device is in proximity to the wireless beacon. Additionally, a server attempting to determine that the user is at the new location may leverage communication devices of users known to be at the location (e.g., employees, residents, etc.) to connect with the user's communication device and determine that the user is in proximity to the users at or nearby the location.

The device may utilize short range wireless communication protocols to provide short range wireless communications with users' communication devices, such as through Bluetooth Low Energy (BLE), LTE Direct, or other communication protocol. The devices using the short range wireless communication protocols may communicate with devices in possession of users in order to connect to the device and determine the user is in proximity to the beacon. For example, the short range wireless communication protocols may be range limited by signal strength, proximity detection, and/or physical structures to only connect with the user's communication device when the user is at or nearby the new location. The devices may provide additional functionality, such as establishing a connection with another device or server to provide connection information about the connections made between the user's communication device and the device associated with the location. Thus, the beacons may provide proximity detection of users and triangulation of users' positions/locations at the new location.

Accordingly, the device (or devices) at the location may communicate with the communication device in possession of the user through Bluetooth Low Energy (BLE), LTE Direct, or another communication protocol receivable by the communication device. When establishing a connection, the device may emit a communication signal including an identifier for the device. A connection module of the communication device may execute specialized hardware and/or software to passively monitor for the short range wireless communications, for example, through a communication module. When the communication device detects the signal and verifies the one or more identifiers, both the communication device and the device at the location may ramp up in power and establish a connection, where the connection may further enable the communication device to communicate additional information to the device at the location, such as connection information (e.g., an identifier) and/or other stored data. The device may be connected to a networked device at the location or the device may include network functionality to communicate with other devices and/or servers itself. Thus, the device at the location may communicate the connection information identifying the user's communication device, and therefore the user, at the location. The server may then have connection information having at least one connection between the user's communication device and the device at the location.

The server may execute specialized hardware and/or software to access nearby user information for the location. The nearby user information may include users associated with the location, users presently at the location, and/or users who have visited the location. The nearby user information may be determined through receiving user input corresponding to the location, such as a work address, through scraping social networking and other user information resources to determine the location of the user, and/or through connections between the communication devices for the nearby users and one or more devices at the location. The nearby user information may also be determined using a check-in for one or more users, such as GPS coordinates provided by the users. Thus, the nearby user information includes information identifying users associated with the new location. For example, a second user may be determined to be associated with the new location. Nearby users may be users that co-locate at a work location, a home location, and/or a merchant location (e.g., the same restaurant). Thus, when the first user is determined to be located at a location, other users that may co-locate with them at that location may be determined.

The server may access social networking information for the first user and the nearby users (e.g., the second user). The server may utilize the social networking information with the first user's connection information and the nearby user information to determine one or more contact recommendations having a proposed social networking connection between the first user and one or more users in the nearby location. The contact recommendation may be determined based on previous social networking connections of the user. For example, if the first user and the second user are not previously connected, the contact recommendation may propose a social networking connection between the two users. The contact recommendation may be communicated to the first user and/or the second user, who may accept the social networking connection. In various embodiments, the server may provide a social networking service that provides one or more social networking contacts to the first user and the second user. Thus, the users may be provided with each other's social networking contact or a request/proposed connection within the social networking service. In other embodiments, another entity or entities may provide social networking services, which may also receive the contact recommendations and processes the contact recommendations to determine proposed social networking connections. As discussed herein, users that may be determined to be co-locating (either on as frequent, occasional, and/or one time basis) may be informed of the other users to form social networking connections. Thus, when a user becomes associated with a new work or home location, social networking contacts of users that me co-locate at the location may be determined. Similarly, using connections between either wireless beacons and/or other communication devices of other users at a location (e.g., merchant location) the first user may also be proposed social networking contacts for users that co-locate together. Thus, if a user's device connects with another user's device, such as at a coffee shop, library, workplace, etc., the first user may be provided with the other user's social networking contact.

Moreover, the nearby user information may be utilized to determine third related parties. Thus, if the first user is connected to a third user and the second party is connected to the same third user, the first user and the second user may be provided with the contact recommendation based on their same or similar locations and the shared contact with the third user. The server may only provide social networking contact recommendations based on shared locations and contacts, or may increase in queue, heighten, or provide another higher value to the contact recommendation based on the shared location with the shared contact.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a user 104, a communication device 110, a communication device 120, a location 130 having a wireless beacon 132, and a connection management server 140 in communication over a network 160. User 102 may bring and/or utilize communication device 110 while at location 130, for example, to connect with wireless beacon 132. Using connection information for the connection between communication device 110 and wireless beacon 132, connection management server 140 may determine that user 102 is now associated with location 130. Connection management server 140 may then determine other users associated with location 130, such as user 104 having communication device 120. Using the social networking information for user 102 and user 104 (e.g., a social networking contact name, account, address, etc.) a contact recommendation between user 102 and user 104 may be proposed, for example, if user 102 and user 104 are not previously connected. User 102 and user 104 may then view the contact recommendation on communication device 110 and communication device 120, respectively, and act accordingly.

Communication device 110, communication device 120, wireless beacon 132, and connection management server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Communication device 110 may be implemented as a communication device that may utilize appropriate hardware and software configured for wired and/or wireless communication with communication device 120, wireless beacon 132, and/or connection management server 140. Communication device 110 may be utilized by user 102, who may correspond to a user not previously associated with location 130. However, user 102 may arrive at location 130 and begin generating connection information for one or more connections between communication device 110 and wireless beacon 132. In various embodiments, communication device 110 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may function similarly.

Communication device 110 of FIG. 1 contains a connection module 112, other applications 114, a database 116, and a communication module 118. Connection module 112 and other applications 114 may correspond to executable processes, procedures, and/or applications with associated hardware. In other embodiments, communication device 110 may include additional or different hardware and software as required.

Connection module 112 may correspond to one or more processes to execute modules and associated devices of communication device 110 to establish a connection with wireless beacon 132, including a check-in with location 130 that identifies user 102 as being located at, in, on, nearby, and/or otherwise associated with location 130. In this regard, connection module 112 may correspond to specialized hardware and/or software utilized by communication device 110 with wireless beacon 132 to establish a connection and complete a connection with wireless beacon 132 to establish connection information for communication device 110 with wireless beacon 132, which may be utilized by connection management server 140 to determine that user 102 is located at location 130 or otherwise associated with location 130. A connection by connection module 112 with wireless beacon 132 may provide and/or verify the identity of user 102, including transmission of an identifier for user 102 and/or communication device 110, or other information used to process a connection for communication device 110 and a check-in for user 102. Thus, connection information may be established when a connection is made by connection module 112 with wireless beacon 132. Connection information generated by communication device 110 and wireless beacon 132 may also correspond to a plurality of connections between communication device 110 and wireless beacon 132. Thus, in certain embodiments, connection information necessary to associated user 102 with location 130 may correspond to more than one connections between communication device 110 and wireless beacon 132 (e.g., connections made at more than one time, such as on separate days, separate times of day, and/or requiring a disconnect between connections) as discussed herein. Moreover, the connection information may also include a time of connection, a time of initiation of the connection, and/or a time of disconnection.

In various embodiments, connection module 112 receives short range wireless communications from communication device 120 and/or wireless beacon 132 through communication module 118 at location 130 and transmits information to wireless beacon 132, including identification information for a check-in process that associates user 102 with wireless beacon 132 connected with communication device 110. For example, wireless beacon 132 may be located at an entrance, exit, on, and/or within location 130 and set up to communicate with communication device 110 when communication device 110 is in proximity to wireless beacon 132. Thus, wireless beacon 132 may be range limited to connect only with devices (e.g., communication device 110) within the specified area, such as a radius around wireless beacon 132, a distance away from wireless beacon 132, and/or a signal direction for wireless beacon 132. When communication device 110 enters the proximity radius for one or more of wireless beacon 132, communication device 110 and wireless beacon 132 may connect and connection information including an identifier for user 102 and/or communication device 110 may be transmitted to wireless beacon 132. Although communication device 110 and communication device 120 are shown as forming a connection over network 160 (e.g., over a network connection and/or on the same network, such as an office Ethernet network), in various embodiments communication device 110 and communication device 120 may connect directly, such as through the aforementioned short range wireless communication protocols (e.g., BLE, LTE Direct, NFC, etc.).

Connection module 112 may execute in the background of an operating system of communication device 110 and be configured to establish connections, using communication module 118 of communication device 110, with wireless beacon 132. The connection may be established with or without user input from user 102. For example, wireless beacon 132 may broadcast a token, such as a universally unique identifier (UUID), for reception by connection module 112, as explained herein. Connection module 112 may utilize communication module 118 of communication device 110 to receive the token from wireless beacon 132. If connection module 112 acknowledges the UUID as identifying location 130, wireless beacon 132, and/or connection management server 140 (e.g., if connection module 112 determines the UUID corresponds to a request to establish a communication channel and/or process and complete a check-in), connection module 112 may transmit an identifier corresponding to user 102 and/or communication device 110 back to wireless beacon 132. Connection module 112 may utilize communication module 118 of communication device 110 to communicate with wireless beacon 132 (e.g., over near field communication, Bluetooth, Bluetooth Low Energy, radio, infrared, LTE Direct, or other communication protocol). The identifier from communication device 110 may include, be transmitted with, concatenated with, or otherwise bundled with the identifier received from wireless beacon 132. In other embodiments, different information may be transmitted to wireless beacon 132, such as a name or other personal information for user 102, a work history for user 102, a calendar or other personal schedule for user 102, or other information that may be utilized to further associated user 102 with location 130. Thus, the information transmitted to wireless beacon 132 does not need to be utilized to process and/or complete a check-in with location 130 in all embodiments. Instead, the connection information may be sufficient to determine user 102 is located at or associated with location 130.

Once a connection is established with wireless beacon 132, the process may associate user 102 with wireless beacon 132 used to connect to communication device 110, and, thus, location 130. Once communication device 110 connects to wireless beacon 132, the connection information for the connection (e.g., the connection information including an identifier and information for the check-in, such as the beacon(s) of wireless beacon 132 that communication device 110 is connected to, as well as any time, date, and/or number of connection information) may be transmitted to connection management server 140 for processing. In various embodiments, connection management server 140 may include information for one or more previous connections between communication device 110 and wireless beacon 132. Thus, connection management server 140 may update the previous connection information with the new connection information received from wireless beacon 132. Connection management server 140 may process the connection information to determine contact recommendations for user 102, as discussed herein.

Once a connection is established with wireless beacon 132 by connection module 112, connection module 112 may be utilized to transmit further information to wireless beacon 132 for use by connection management server 140. For example, connection module 112 may access information stored to database 116, such as user personal, financial, work, social networking, scheduling, and/or travel information. Such information may be transmitted to connection management server 140 for processing to determine whether user 102 is associated with location 130. For example, connection management server 140 may determine, based on received information and/or connection information, whether user 102 is now working, living, or otherwise continuing to visit/reside at location 130, or whether user 102 is only visiting location 130 for a limited period of time, as discussed herein. Such information may be utilized to determine contact recommendations for user 102. However, in other embodiments, connection management server 140 may utilize only the connection information to determine contact recommendations, as discussed herein. Connection module 112 may also interface with one or more APIs for applications and/or modules executed by communication device 110 to retrieve such information. In the aforementioned embodiments, user 102 may not previously have visited location 130, or may have only visited location 130 on a limited basis previously, and connection management server 140 may determine new contact recommendations based on user 102 being detected at location 130 through the aforementioned connection information.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a user to send and receive emails, calls, texts, and other notifications through network 160. In various embodiments, other applications 114 may be utilized to receive notifications and/or alerts from connection management server 140. Such notifications and/or alerts may correspond to contact recommendation including proposed social networking connections for user 102. Thus, the contact recommendations may be received through a messaging application, such as an SMS or MMS text message to a phone number, an email to an email address, a message to a messenger account, and/or a phone call to the phone number. The contact recommendation may also be retrieved through a browser application and a social networking service and/or through a dedicated application of the social networking service.

In various embodiments, other applications 114 may include financial applications, such as banking, online payments, money transfer, or other applications associated with a payment provider. As previously discussed, other applications may include mapping applications, social networking applications, and/or browser applications. Other applications 114 may include device interfaces and other display modules that may receive input from user 102 and/or output information to user 102. For example, other applications 114 may contain software programs, executable by a processor, including a graphical user interface (GUI) configured to provide an interface to the user.

Communication device 110 may further include database 116 stored to a transitory and/or non-transitory memory of communication device 110, which may store various applications and data and be utilized during execution of various modules of communication device 110. Thus, database 116 may include, for example, identifiers such as operating system registry entries, cookies associated with connection module 112 and/or other applications 114, identifiers associated with hardware of communication device 110, or other appropriate identifiers, such as identifiers used for payment/user/device authentication or identification. Database 116 may include additional information communicated to wireless beacon 132, and/or connection management server 140, as well as received contact recommendations.

Communication device 110 includes at least one communication module 118 adapted to communicate with communication device 120, wireless beacon 132, and/or connection management server 140. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with wireless beacon 132 using short range communications, such as Bluetooth Low Energy, LTE Direct, WiFi, radio frequency, infrared, Bluetooth, and near field communications.

In similar fashion to communication device 110, communication device 120 may be implemented as a communication device that may utilize appropriate hardware and software configured for wired and/or wireless communication with communication device 110, wireless beacon 132, and/or connection management server 140. However, communication device 120 may be utilized by user 104, who is already associated with location 130. For example, user 104 may correspond to a nearby user for location 130, such as an employee, resident, or other user already associated with location 130 when user 102 visits location 130 and generated connection information for a connection between communication device 110 and wireless beacon 132. In various embodiments, communication device 120 may be implemented as a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may function similarly.

Communication device 120 of FIG. 1 contains a connection module 122, other applications 124, a database 126, and a communication module 128. Connection module 122 and other applications 124 may correspond to executable processes, procedures, and/or applications with associated hardware. In other embodiments, communication device 120 may include additional or different hardware and software as required.

Connection module 122 may correspond to one or more processes to execute modules and associated devices of communication device 120 to establish a connection with wireless beacon 132, including a check-in with location 130 that identifies user 104 as being located at, in, on, nearby, and/or otherwise associated with location 130. As discussed herein, user 104 may be previously associated with location 130, such as an employee or resident of location 130, or otherwise associated with location 130. Thus, in various embodiments, connection module 122 may not be necessary to associate user 104 with location 130. For example, user 104 may utilize a browser application, dedicated application for location 130, or may otherwise register as associated with location 130 (e.g., with a supervisor, owner, etc., for location 130).

However, in other embodiments, connection module 122 may be utilized to determine user 104 is at, on, within, or otherwise associated with location 130 using connection information for user 104 having one or more connections between communication device 120 and wireless beacon 132. In this regard, connection module 122 may correspond to specialized hardware and/or software utilized by communication device 120 with wireless beacon 132 to establish and complete a connection with wireless beacon 132 to establish connection information for communication device 120 with wireless beacon 132, which may be utilized by connection management server 140 to determine that user 104 is located at location 130 or otherwise associated with location 130. A connection by connection module 122 with wireless beacon 132 may provide and/or verify the identity of user 104, including transmission of an identifier for user 104 and/or communication device 120, or other information used to process a connection for communication device 120 and a check-in for user 104. Thus, connection information may be established when a connection is made by connection module 122 with wireless beacon 132. Connection information generated by communication device 120 and wireless beacon 132 may also correspond to a plurality of connections between communication device 120 and wireless beacon 132. Thus, in certain embodiments, connection information necessary to associate user 104 with location 130 may correspond to more than one connections between communication device 120 and wireless beacon 132 (e.g., connections made at more than one time, such as on separate days, separate times of day, and/or requiring a disconnect between connections) as discussed herein. Moreover, the connection information may also include a time of connection, a time of initiation of the connection, and/or a time of disconnection.

In various embodiments, connection module 122 receives short range wireless communications from communication device 110 and/or wireless beacon 132 through communication module 128 at location 130 and transmits information to wireless beacon 132, including identification information for a check-in process that associates user 104 with wireless beacon 132 connected with communication device 120. For example, wireless beacon 132 may be located at an entrance, exit, on, and/or within location 130 and set up to communicate with communication device 120 when communication device 120 is in proximity to wireless beacon 132. Thus, wireless beacon 132 may be range limited to connect only with devices (e.g., communication device 120) within the specified area, such as a radius around wireless beacon 132, a distance away from wireless beacon 132, and/or a signal direction for wireless beacon 132. When communication device 120 enters the proximity radius for one or more of wireless beacon 132, communication device 120 and wireless beacon 132 may connect and connection information including an identifier for user 104 and/or communication device 120 may be transmitted to wireless beacon 132. Although communication device 110 and communication device 120 are shown as forming a connection over network 160 (e.g., over a network connection and/or on the same network, such as an office Ethernet network), in various embodiments communication device 110 and communication device 120 may connect directly, such as through the aforementioned short range wireless communication protocols (e.g., BLE, LTE Direct, NFC, etc.).

Connection module 122 may execute in the background of an operating system of communication device 120 and be configured to establish connections, using communication module 128 of communication device 120, with wireless beacon 132. The connection may be established with or without user input from user 104. For example, wireless beacon 132 may broadcast a token, such as a universally unique identifier (UUID), for reception by connection module 122, as explained herein. Connection module 122 may utilize communication module 128 of communication device 120 to receive the token from wireless beacon 132. If connection module 122 acknowledges the UUID as identifying location 130, wireless beacon 132, and/or connection management server 140 (e.g., if connection module 122 determines the UUID corresponds to a request to establish a communication channel and/or process and complete a check-in), connection module 122 may transmit an identifier corresponding to user 104 and/or communication device 120 back to wireless beacon 132. Connection module 122 may utilize communication module 128 of communication device 120 to communicate with wireless beacon 132 (e.g., over near field communication, Bluetooth, Bluetooth Low Energy, radio, infrared, LTE Direct, or other communication protocol). The identifier from communication device 120 may include, be transmitted with, concatenated with, or otherwise bundled with the identifier received from wireless beacon 132. In other embodiments, different information may be transmitted to wireless beacon 132, such as a name or other personal information for user 104, a work history for user 104, a calendar or other personal schedule for user 104, or other information that may be utilized to further associated user 104 with location 130. Connection module 122 may interface with one or more APIs for applications and/or modules executed by communication device 120 to retrieve such information. Thus, the information transmitted to wireless beacon 132 does not need to be utilized to process and/or complete a check-in with location 130 in all embodiments. Instead, the connection information may be sufficient to determine user 104 is located at or associated with location 130.

Once a connection is established with wireless beacon 132, the process may associate user 104 with wireless beacon 132 used to connect to communication device 120, and, thus, location 130. Once communication device 120 connects to wireless beacon 132, the connection information for the connection (e.g., the connection information including an identifier and information for the check-in, such as the beacon(s) of wireless beacon 132 that communication device 120 is connected to, as well as any time, date, and/or number of connection information) may be transmitted to connection management server 140 for processing. In various embodiments, connection management server 140 may include information for one or more previous connections between communication device 120 and wireless beacon 132. Thus, connection management server 140 may update the previous connection information with the new connection information received from wireless beacon 132. Connection management server 140 may then determine user 104 is associated with location 130, and may add user 104 to a list of nearby users for location 130. The nearby user information may then be utilized to determine contact recommendations for user 102, such as a proposed social networking connection between user 102 and user 104. Thus, once connection management server 140 receives information necessary to determine that user 104 is a nearby user associated with location 130, connection management server may utilize the information to provide proposed social networking connection between user 102 and user 104 if no connection previously exists.

In various embodiments, communication device 120 includes other applications 124 as may be desired in particular embodiments to provide features to communication device 120. For example, other applications 124 may include security applications for implementing client-side security features, programmatic client applications for interfacing with appropriate application programming interfaces (APIs) over network 160, or other types of applications. Other applications 124 may also include email, texting, voice and IM applications that allow a user to send and receive emails, calls, texts, and other notifications through network 160. In various embodiments, other applications 124 may be utilized to receive notifications and/or alerts from connection management server 140. Such notifications and/or alerts may correspond to contact recommendations including proposed social networking connections for user 104 (e.g., a proposed social networking connection with user 102, such as a friend/contact request, contact information, etc.). Thus, the contact recommendations may be received through a messaging application, such as an SMS or MMS text message to a phone number, an email to an email address, a message to a messenger account, and/or a phone call to the phone number. The contact recommendation may also be retrieved through a browser application and a social networking service and/or through a dedicated application of the social networking service.

In various embodiments, other applications 124 may include financial applications, such as banking, online payments, money transfer, or other applications associated with a payment provider. As previously discussed, other applications may include mapping applications, social networking applications, and/or browser applications. Other applications 124 may include device interfaces and other display modules that may receive input from user 104 and/or output information to user 104. For example, other applications 124 may contain software programs, executable by a processor, including a graphical user interface (GUI) configured to provide an interface to the user.

Communication device 120 may further include database 126 stored to a transitory and/or non-transitory memory of communication device 120, which may store various applications and data and be utilized during execution of various modules of communication device 120. Thus, database 126 may include, for example, identifiers such as operating system registry entries, cookies associated with connection module 122 and/or other applications 124, identifiers associated with hardware of communication device 120, or other appropriate identifiers, such as identifiers used for payment/user/device authentication or identification. Database 126 may include additional information communicated to wireless beacon 132, and/or connection management server 140, as well as received contact recommendations.

Communication device 120 includes at least one communication module 128 adapted to communicate with wireless beacon 132, operator device 124, and/or connection management server 140. In various embodiments, communication module 128 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 128 may communicate directly with wireless beacon 132 using short range communications, such as Bluetooth Low Energy, LTE Direct, WiFi, radio frequency, infrared, Bluetooth, and near field communications.

Location 130 may correspond to a physical location that a user may visit on one or more occasions. Location 130 may correspond to a workplace, a residential location, a transportation hub or pickup/stop place, a restaurant, a merchant storefront, a gym or other exercise location, or other location where user 102 may visit and user 104 may be a user previously associated with location 130. Although only one location is shown, a plurality of locations may include similar devices that function similarly. Additionally, connection management server 140 may be associated with only location 130 or may be associated with a plurality of location (e.g., where connection management server 140 corresponds to a server providing social networking connections based on locations users are associated with).

Location 130 of FIG. 1 further includes wireless beacon 132. Wireless beacon 132 may include hardware and software necessary to execute the processes and functions as described below. In other embodiments, location 130 may include devices, servers, displays, mechanisms, hardware, and/or software as required.

Wireless beacon 132 may be maintained, for example, by an owner, operator, manager, and/or administrator of location 130 and/or connection management server 140. Wireless beacon 132 may be implemented using any appropriate hardware and software configured for wireless communication with communication device 110/120. For example, in one embodiment, wireless beacon 132 may be implemented as a dongle device including a hardware processor and a communication module, for example, attached to, connected with, and/or corresponding to location 130. Wireless beacon 132 may also be implemented as devices incorporated within a personal computer (PC), a smart phone, laptop computer, and/or other types of computing devices capable of transmitting and/or receiving data, such as an IPAD® from APPLE®. Wireless beacon 132 may also act as a stand-alone device including a processor, communication module, and/or network interface component configured to communicate with communication device 110/120 and/or connection management server 140. Although wireless beacon 132 is described singly, a plurality of wireless beacons may correspond to location 130, which may function similarly. In various other embodiments, wireless beacon 132 may be a different device, such as a communication device of a user that connects with communication device 110/120.

Wireless beacon 132 may be located within, at, on, near, or corresponding to location 130. Wireless beacon 132 may be limited, either by signal range or physical properties of location 130/wireless beacon 124, to connect to communication device 110/120 only when communication device 110/120 is within a certain distance range of location 130. For example, wireless beacons 122 may only connect to communication device 110/120 within location 130. In various embodiments, wireless beacon 132 may be located within a sub-area/location of location 130 and configured to only connect to devices within the sub-area/location (e.g., an entrance, exit, common room, etc.). Thus, wireless beacon 132 may be associated with the sub-area/location such that when communication device 110/120 connects with wireless beacon 132, communication device 110/120 may be associated with the area (e.g., entrance location).

Wireless beacon 132 of FIG. 1 contains processes, procedures, and/or applications executable by a hardware processor, for example, a software program, configured to interact with communication device 110/120 and/or connection management server 140. Thus, regardless of the implementation of wireless beacon 132 as discussed above, wireless beacon 132 may utilize a connection/check-in process and include or be connected to a communication module. In other embodiments, wireless beacon 132 may include additional or different hardware and software as required.

Wireless beacon 132 may include an application for transmitting requests to establish a connection between a device (e.g., communication device 110/120) and wireless beacon 132. The requests may be unique to wireless beacon 132, thereby identifying wireless beacon 132. Wireless beacon 132 may utilize short range wireless communications of wireless beacon 132 to transmit the requests to establish a connection, including an identifier such as a Universally Unique Identifier (UUID). If communication device 110/120 receives a request to establish the connection with wireless beacon 132 and responds with an identifier for user 102 and/or communication device 110/120 (potentially including the UUID and other information necessary to identify the aforementioned user/item/device), wireless beacon 132 to ramp up in power and create a connection between communication device 110/120 and wireless beacon 132.

Wireless beacon 132 may transmit the request to establish the connection with wireless beacon 132 as a short range wireless communication (e.g. a BLE protocol communication) including a "wake up" process for communication application 112 of device 110/120 and/or a token for wireless beacon 132 transmitting the request. In other embodiments, the request and/or connection may utilize near field communication, radio communication, infrared communication, or Bluetooth communication. Additionally, although wireless beacon 132 may utilize BLE protocol communications to effectuate an "always on" type service where the UUID and "wake up" process are transmitted continuously, other communication protocols used to provide an "always on" service may include QUALCOMM® LTE Direct or similar device-to-device communication technology. BLE and LTE Direct may both be utilized to provide discovery of nearby devices to wireless beacon 132 (e.g., communication device 110/120) and establishment of a connection for data transfers. In other embodiments, wireless beacon 132 may correspond to other devices, such as WiFi capable devices, near field communication devices, etc.

The request may be specific to communication device 110/120 by including information that is specific to user 102 and/or communication device 110/120, such as a name, identifier, or device identifier. The information specific to user 102 may be determined from information previously provided to connection management server 140, such as a name, identifier, etc. Thus, in certain embodiments, only communication device 110/120 will pick up and authenticate the request. In other embodiments, only communication device 110/120 may pick up the request if wireless beacon 132 is range limited to only transmit the request to devices within a certain proximity to sub-areas/locations within location 130.

After wireless beacon 132 receives connection information (e.g., an identifier) from communication device 110/120, wireless beacon 132 may determine communication device 110/120 is in proximity to wireless beacon 132 and thus location 130. Wireless beacon 132 may pass the connection information to connection management server 140 to associate communication device 110/120 with the wireless beacon 132, and thus, the location for wireless beacon 132. Connection management server 140 may then determine user 102 is located at location 130 and may determine contact recommendations for user 102, such as a proposed social networking connection between user 102 and user 104, as discussed herein.

Wireless beacon 132 may utilize a communication module to pass the connection information received from communication device 110/120 to connection management server 140, such as a through a connection with network 160. Thus, wireless beacon 132 includes a communication module adapted to communicate with communication device 110/120, and/or connection management server 140. The communication module may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. The communication module of wireless beacon 132 may also communicate with communication device 110/120 and/or connection management server 140 using short range communications, such as Bluetooth Low Energy, LTE Direct, WiFi, radio frequency, infrared, Bluetooth, and near field communications (e.g., if connection management server 140 is local to location 130).

Connection management server 140 may be implemented as a server or other computing device configured to determine contact recommendations upon detecting user 102 as associated with location 130 through received connection information. Connection management server 140 may also receive information for and/or determine nearby users previously associated with location 130, such as user 104. In this regard, connection management server 140 includes one or more processing applications which may be configured to interact with communication device 110/120 and/or wireless beacon 132 to determine nearby user information and/or contact recommendations, for example, a proposed social networking connection between user 102 and user 104. Although a server is shown, the server may be managed or controlled by any suitable processing device.

Connection management server 140 of FIG. 1 contains a connection discovery module 150, a connections networking module 142, other applications 144, a database 146, and a communication module 148. Connection discovery module 150, connections networking module 142, and other applications 144 may correspond to executable processes, procedures, and/or applications with associated hardware. In other embodiments, connection management server 140 may include additional or different hardware and software as required.

Connection discovery module 150 may correspond to one or more processes to execute modules and associated devices of connection management server 140 to access connection information for user 102, nearby user information for location 130 including information identifying user 104 as a user associated with location 130, and social networking information including a social networking contact for user 102 and user 104 and determine contact recommendations for user 102 using the aforementioned information. In this regard, connection discovery module 150 may correspond to specialized hardware and/or software that may first access connection information for user 102, for example, from database 146, which may include one or more connections between communication device 110 and wireless beacon 132. The connection information may be received from wireless beacon 132. Each connection between communication device 110 and wireless beacon 132 may be communicated to connection management server 140 as a separate connection instance or wireless beacon 132 may store connection instances over time and communicate the connection instance to connection management server 140. Thus, connection management server 140 may update connection information for user 102 having one or more connections between communication device 110 and wireless beacon 132 as necessary. The connection information may be processed to determine that user 102 is associated with location 130. User 102 may become associated with location 130 through one or more connections between communication device 110 and wireless beacon 132, an amount of time for the one or more connections, and/or a time of initiation and/or disconnection of the one or more connections. For example, user 102 may only become considered a new employee of resident of location 130 if user 102 has several connections between communication device 110 and wireless beacon 132 (e.g., if user 102 is not simply visiting location 130 one or a few times), if the connection(s) between communication device 110 and location 130 are for a set period of time (e.g., an 8 hour workday, or a 12 hour rest period), and/or if the connection(s) are established and/or disconnected at certain times (e.g., a connection initiation at the start of a work day or when a user would normally arrive home after work and/or a disconnection at the end of a work day or when a user would leave for work in the morning). Such determinations may also be based on the nature of location 130 and/or knowledge about user 102, such as type of employment. If connection discovery module 150 determines user 102 is now associated with location 130, connection discovery module 150 may determine contact recommendations for user 102.

Connection discovery module 150 may further access nearby user information for location 130. Nearby user information may be communicated to connection management server 140 from another entity, such as an owner, administrator, manager, or other entity associated with location 130. The nearby user information may be generated by the entity using known and/or submitted information, such as a listing of employees, residents, checked-in users, or other users known to be associated with location 130. The nearby user information may also be determined by the entity and/or connection discovery module 150 through processing and/or scraping other sources of information, such as social networking services, phone books, address books, employee and/or resident listings, online accounts, or other sources of information for users that may be associated with location 130. In further embodiments, connection discovery module 150 may determine nearby user information from received connection information, for example, connection information that identifies user 104 as associated with location 130, as described above in reference to user 102 and communication device 110. Thus, user 104 may be determined to be a nearby user 102 for location 130 if connection discovery module 150 determines that user 104 is associated with location 130 based on connections between communication device 120 and wireless beacon 132. Nearby user information accessed by connection discovery module 150 may include user 104 as a user associated with location 130, such as a current resident, employee, or other user. Nearby users may be those users determined to be in proximity to, within, on, or otherwise associated with location 130.

Connection discovery module 150 may also access social networking contact information for user 102 and the nearby users, such as user 104. Connection discovery module 150 may access the social networking contact information from a social networking service offered by connection management server 140, for example, a service provided by connections networking module 142. In other embodiments, a third party may provide the social networking service. The social networking contact information may include at least a social networking contact for user 102 and the nearby users (e.g., a social networking name, address, contact information, etc.). In further embodiments, the social networking contact information may also include social networking contacts for user 102 and the nearby users (e.g., a connected users list, a friends list, etc.).

Using the connection information for user 102, the nearby user information having user 104, and the social networking contact information for user 102 and the nearby users (e.g., user 104), a contact recommendation may be generated for user 102 and/or the nearby users. The contact recommendation may be determined if user 102 and one or more of the nearby users are not social networking contacts (e.g., connected users on the social networking service). Thus, if user 102 and user 104 are not previously connected users, connection discovery module 150 may determine a contact recommendation having a proposed social networking connection between user 102 and user 104. Connection discovery module 150 may then communicate the contact recommendation to one or more of user 102 and user 104 to accept, ignore, or decline. Connection discovery module 150 may communicate the contact recommendation as a private message, email, and/or text, or may utilize the social networking service to present the contact recommendation (e.g., through a recommended user service, private message within the service, etc.).

Connections networking module 142 may correspond to one or more processes to execute modules and associated devices of connection management server 140 to provide a social networking service and one or more social networking accounts and contacts for user 102 and user 104. In this regard, connections networking module 142 may correspond to specialized hardware and/or software that may provide an account for use with the social networking service to user 102 and user 104. The account may include personal, financial, and/or entered/uploaded information by user 102/104. The account may also provide access to the social networking service enabling user 102 and/or user 104 to form connections with other users using the social networking service and/or other social networking services. Connections with other users may include additions to a friend or associated user list and may allow the owner of an account to view another users account information, contact the user, and/or perform other social interactions. Connections networking module 142 may also provide display of contact recommendations determined by connection discovery module 150 and establishment of connections corresponding to proposed social networking connections in the contact recommendations. Connections networking module 142 may therefore provide one or more user interfaces for management of a social networking account on the social networking service, for example, through one or more webpages of a website and/or through a dedicated device application.

In various embodiments, one or more features of connection discovery module 150 and connections networking module 142 may be incorporated in the same module so as to provide their respective features in specialized hardware and/or software of one module.

In various embodiments, connection management server 140 includes other applications 144 as may be desired in particular embodiments to provide features to connection management server 140. For example, other applications 144 may include security applications for implementing server-side security features, programmatic client applications for interfacing with appropriate application programming interfaces (APIs) over network 170, or other types of applications. Other applications 144 may also include email, texting, voice and IM applications that allow users of a social networking service to communication. Other applications 144 may include device interfaces and other display modules that may receive input and/or output information. For example, other applications 144 may contain software programs, executable by a processor, including a graphical user interface (GUI) configured to provide an interface to one or more users.

Connection management server 140 may further include database 146 stored to a transitory and/or non-transitory memory of connection management server 140, which may store various applications and data and be utilized during execution of various modules of connection management server 140. Thus, database 146 may include social networking service websites and/or applications, as well as social networking account information. Database 146 may also store determined contact recommendations.

Connection management server 140 includes at least one communication module 148 adapted to communicate with communication device 110/120 and/or wireless beacon 132. In various embodiments, communication module 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 148 may communicate directly with wireless beacon 132 using short range communications, such as Bluetooth Low Energy, LTE Direct, WiFi, radio frequency, infrared, Bluetooth, and near field communications where connection management server 140 is local to location 130.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
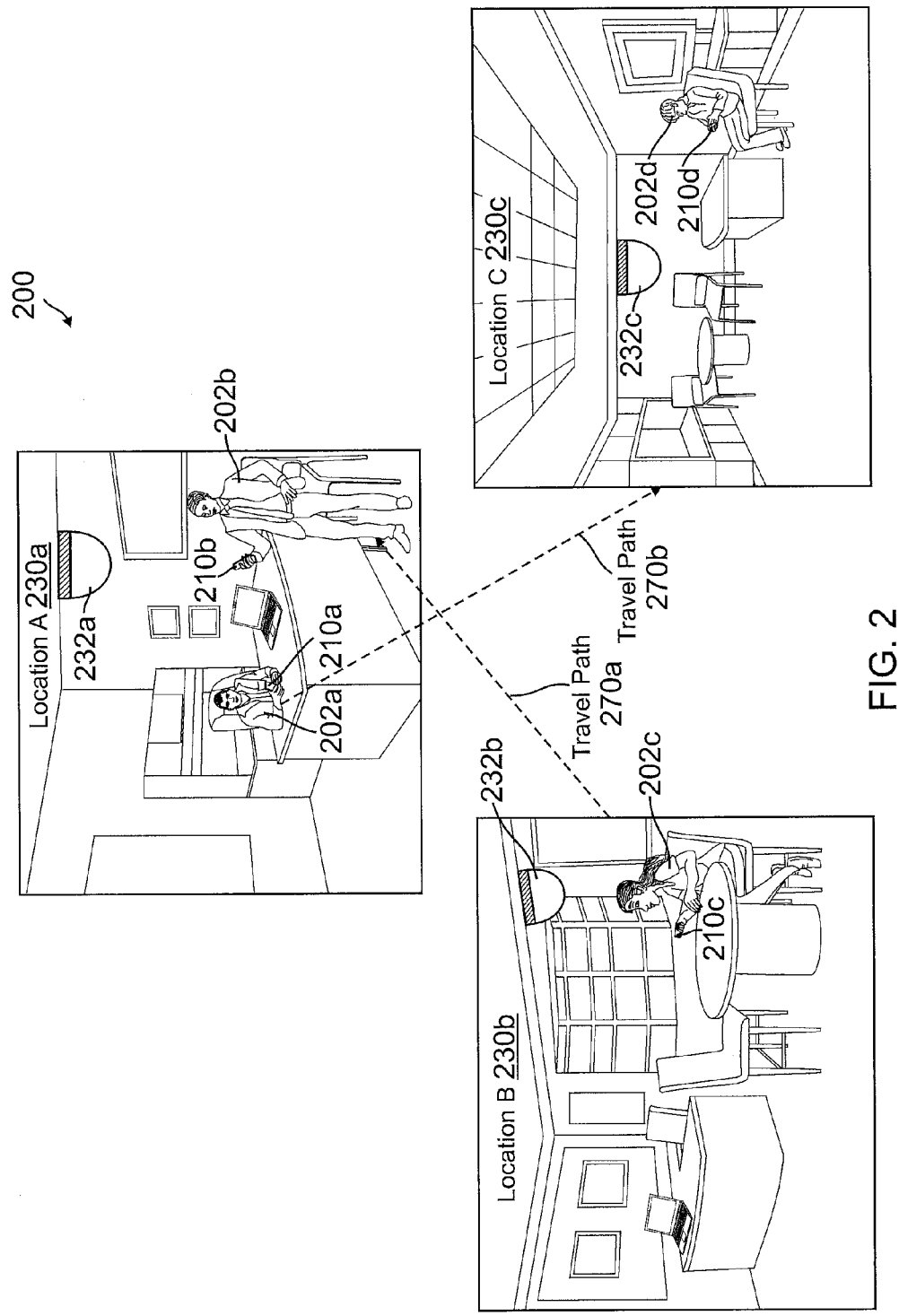
FIG. 2 is an exemplary environment having one or more users in different locations receiving contact recommendations based on their locations, according to an embodiment.

FIG. 2 is an exemplary environment having one or more users in different locations receiving contact recommendations based on their locations, according to an embodiment. Environment 200 of FIG. 2 includes a user 202a having a communication device 210a, a user 202b having a communication device 210b, a user 202c having a communication device 210c, and a user 202d having a communication device 210d all corresponding generally to user 102 and communication device 110, respectively, of FIG. 1. Additionally, environment 200 includes a location A 230a having a wireless beacon 232a, a location B 230b having a wireless beacon 232b, and a location C 230c having a wireless beacon 232c all corresponding generally to location 130 and wireless beacon 132, respectively, of FIG. 1.

In environment 200, users 202a-d are in separate locations 230a-c, where each user may receive one or more contact recommendations by being detected at one or more of locations 230a-c. For example, in one embodiment, users 202a and 202b are located within location A 230a. User 202a may correspond to an employee at location A 230a and residing at their desk. User 202a may be detected at location A 230a and now associated with location A 230a (e.g., working/employed at location A 230a) using communication device 210a and wireless beacon 232a, as discussed herein. Once it is determined that user 202a is associated with location A 230a, contact recommendations may be determined for user 202a with location A 230a. In further embodiments, user 202a may be added to a nearby user information list so that user 202a is now associated with location A 230a.

In another embodiment, user 202b is a new employee at location A 230a or a visitor that may wish to receive contact recommendations for location A 230a. For example, user 202b may have changed offices from location B 230b as shown through a travel path 270a that user 202b takes from location B 230b. User 202b may also be a visitor, however, wish to receive contact recommendation (e.g., through an account setting of a social networking service or through intelligent decision-making by the social networking service). In either embodiment, once arriving at location A 230a, user 202b's communication device 210b may connect with wireless beacon 232a. Connection information may then be utilized to determine user 202b is associated with location A 230a. Using nearby user information (e.g., information identifying user 202a as already working at and associated with location 230a) and social networking information for user 202a and user 202b, a contact recommendation may be determined that proposes a social networking connection between user 202a and user 202b. Additionally, although user 202b is detected at location A 230a using wireless beacon 232a, user 202b may also be detected at location A 230 using a connection between communication device 210a and communication device 210b, where communication device 210b is known to be associated with location A 230a (e.g., user 202b is known to possess communication device 210b and associated with location A 230a).

In another embodiment, user 202c located in location B 230b may be associated with location B 230b, for example, through connection information having connections between communication device 210c and wireless beacon 232b. However, user 202a at location A 230a and user 202c at location C 230c may previously be connected using a social networking service. For example, user 202a and user 202c may previously be family members, friends, or have another relationship. User 202c may also be connected with user 202b as user 202b previously worked at location B 230b. Thus, user 202b and user 202c may either be associated as nearby users for location B 230b or have a previous social networking connection based on working together at location B 230b. Thus, when user 202b is determined to be associated with location A 230a using connection information between communication device 210b and wireless beacon 232a, a contact recommendation between user 202a and user 202b may be determined based on a mutual acquaintance, social networking contact, or similar nearby user information that associated user 202a with user 202c as well as associating user 202b with user 202c. Thus, as user 202a and user 202b share user 202c as a nexus, the contact recommendation may be determined or heightened in priority using the aforementioned information.

Further, user 202a may leave location A 230a to visit and otherwise become associated with location C 230c using a travel path 270b. As previously discussed, once user 202a takes travel path 270b to location C 230c and becomes associated with location C 230c (e.g., using connections between communication device 210a and wireless beacon 232c), user 202a may receive contact recommendations for location C 230c, such as user 202d. User 202d may be a previously determined nearby user for location C 230c. Once a contact recommendation is determined having a proposed social networking connection between user 202a and user 202d, the contact recommendation may be communicated to one or more of user 202a and user 202d. Thus, user 202a and/or user 202d may view communication device 210a and/or communication device 210d, respectively, in order to process the contact recommendation. As shown in location C 230c of environment 200, user 202d views communication device 210d to respond to the contact recommendation. User 202d may utilize a messaging, email, and/or text application to receive and view the contact recommendation, or may utilize a browser application or dedicated application accessing the social networking service to view and respond to the contact recommendation. User 202d may then choose to become connected to user 202a using the social networking service, ignore the contact recommendation, or decline the contact recommendation. Once connected user 202d may utilize the social networking service to perform online social interactions with user 202a.

Figure 3:
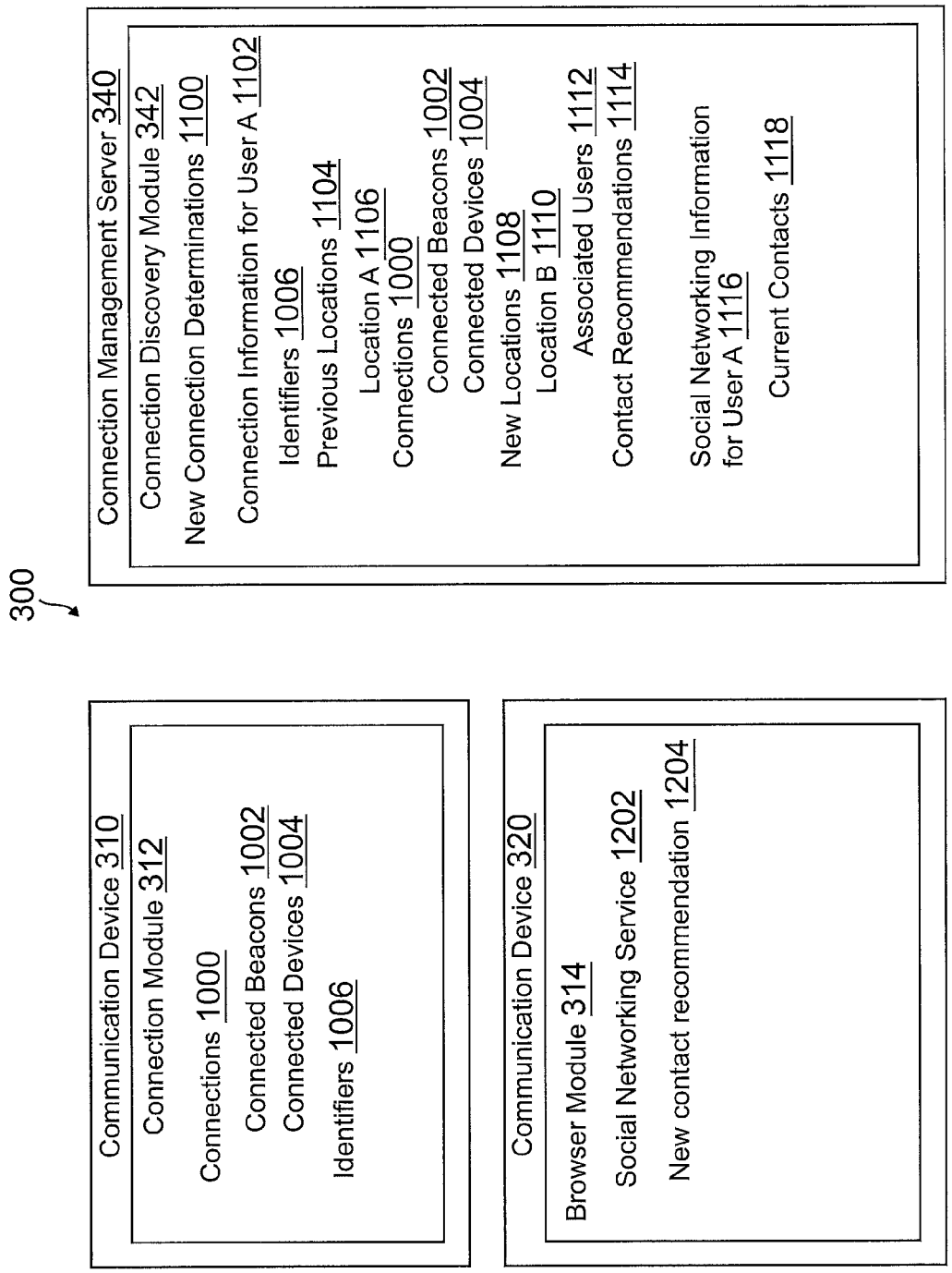
FIG. 3 is an exemplary system environment having a user's communication device connecting to one or more devices for a location and a server determining new contact recommendation for the user based on the location, according to an embodiment.

FIG. 3 is an exemplary system environment having a user's communication device connecting to one or more devices for a location and a server determining new contact recommendation for the user based on the location, according to an embodiment. Environment 300 of FIG. 3 includes a communication device 310, a communication device 320, and a connection management server 340 corresponding to communication device 110, communication device 120, and connection management server 140, respectively, of FIG. 1.

Communication device 310a executes a connection module 312 corresponding generally to the specialized hardware and/or software modules and processes described in reference to connection module 112 of FIG. 1. In this regard, connection module 312 may be utilized to connect with one or more wireless beacons at one or more locations in order to associate a user (not shown) of communication device 310 with the location(s). Thus, connection module 312 may include information for use in forming connections with beacons and/or other devices and information for connected beacons/devices. Connection module 312 includes connections devices 1000 having connected beacons 1002 and connected devices 1004. Connected beacons 1002 may include one or more wireless beacons connected to communication device 310. Similarly, connected devices 1004 may include one or more devices (e.g., communication devices or other device types, such as RFID tags, etc.) connected and/or detected by connection module 312. Connection module 312 may further use identifiers 1006 when forming connections 1000, such as a user, device, or other identifier (e.g., a user account identifier).

Connection management server 340 executes a connection discovery module 342 corresponding generally to the specialized hardware and/or software modules and processes described in reference to connection discovery module 142 of FIG. 1. In this regard, connection discovery module 342 is utilized to determine one or more contact recommendations for the user of communication device 310.

Thus, connection discovery module 342 includes new connection determinations 1100 that may be determined using received and accessed information. For example, new connection determines 1100 may include connection information for User A 1102, where User A may correspond to the user of communication device 310. Connection information for User A 1102 may include identifiers 1006 received in the connection information from connection module 312. Connection information for User A 1102 may also include previous information accessed by connection discovery module 342, such as previous locations 1104 for User A having a location A 1106. Location A 1106 may correspond to a location that User A was previously associated with. However, connection discovery module 342 may utilize connections having connected beacons 1002 and connected devices 1004 to determine new locations 1108 where User A is now located at and associated with. New locations 1108 may therefore include a location B 1110. Connection discovery module 342 may access associated users 1112 for location B 1110, such as nearby user information for location B 1110. Using the aforementioned information for new locations 1108 with accessed social networking information for user A 1116 having current contacts 1118, contact recommendations 1114 may be determined. For example, if current contacts 1118 does not include one or more of the users in associated users 1112, contact recommendations 1114 may include a proposed social networking connection with such users.

Once contact recommendations 1114 are determined by connection discovery module 342, contact recommendations 1114 may be in communication with User A of communication device 310 and/or the other user in one of the contact recommendations. For example, a second user (not shown) of communication device 320 may be a proposed social networking contact for User A. The second user may receive and/or view the contact recommendation using communication device 320. Thus, communication device 320 executes a browser module 314 corresponding generally to one or more of the specialized hardware and/or software modules and processes described in reference to other applications 114 of FIG. 1. In this regard, browser module 314 includes a social networking service 1202 that the second user may access in order to view contact recommendations, such as new contact recommendation 1204. In other embodiments, a messaging, text, email, or dedicated application may display new contact recommendation 1204.

Figure 4:
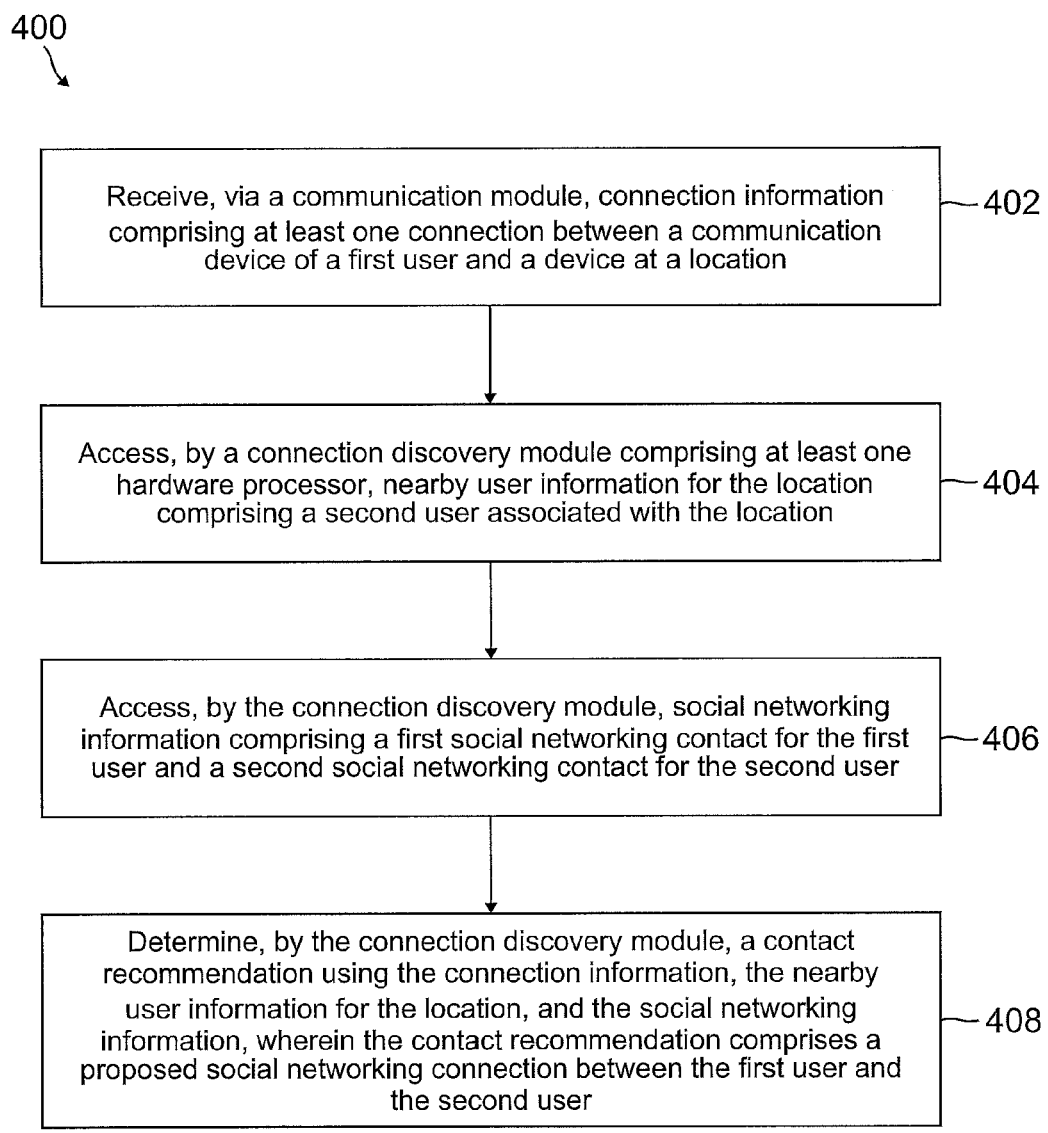
FIG. 4 is a flowchart of an exemplary process for social networking connections through short range wireless devices, according to an embodiment.

FIG. 4 is a flowchart of an exemplary process for social networking connections through short range wireless devices, according to an embodiment. Note that one or more steps, processes, and methods described herein may be omitted, performed in a different sequence, or combined as desired or appropriate.

At step 402, connection information comprising at least one connection between a communication device of a first user and a device at a location is received, via a communication module (e.g., of a connection management server). The connection may use one of near field communication, radio communication, infrared communication, Bluetooth communication, Bluetooth Low Energy (BLE) communication, WiFi communication, and LTE Direct communication. The device may comprise one of a second communication device of a second user at the location and a wireless beacon at the location. In various embodiments, the first user may be previously associated with a second location and the first user may be determined to be associated with the first location (the location described above) based on the connection information. For example, the first location may comprise a current work location and the second location may comprise a previous work location.

Nearby user information for the location is accessed, by a connection discovery module comprising at least one hardware processor, where the nearby user information comprises a second user associated with the location. The second user may be associated with the first location by being determined to be in proximity to the first device in at least one past instance. For example, the second user may be determined to be in proximity to the device in at least one past instance using second connection information comprising at least one second connection between a second communication device of the second user and the device at the location. In other embodiments, the second user may be determined to be in proximity to the device in at least one past instance using a check-in by the second user at the location. The check-in may comprise one of a GPS coordinate detection at the first location, a work address associated with the second user, and a home address associated with the second user.

At step 406, social networking information comprising a first social networking contact for the first user and a second social networking contact for the second user is accessed, by the connection discovery module. The nearby user information may further comprise a third user associated with the location, wherein the social networking information comprises a third social networking contact for the third user. In various embodiments, a connections networking module may provide the first social networking contact for the first user, the second social networking contact for the second user, and/or the third social networking contact for the third user.

A contact recommendation is determined, by the connection discovery module, using the connection information, the nearby user information for the location, and the social networking information, wherein the contact recommendation comprises a proposed social networking connection between the first user and the second user. The contact recommendation may be determined by determining that the first social networking contact for the first user and the second social networking contact for the second user are not previously connected on a social networking service. The contact recommendation may be provided to at least one of the first user and the second user using the connection networking module (e.g., a social networking service). Thus, a social networking connection may be generated between the first user and the second user based on an acceptance of the proposed social networking connection by at least one of the first user and the second user.

In further embodiments, the connection discovery module may determine that the second user is associated with the location based on a first social networking connection between the second social networking contact and the third social networking contact of the third user, wherein the connection discovery module determines that the first user is associated with the third user based on a second social networking connection between the first social networking contact and the third social networking contact of the third user. Thus, the first user and the second user may share a contact in the third user. Thus, the contact recommendation is further based on the first social networking connection and the second social networking connection. If the first and third users are not in contact, the connection discovery module may further determine a second contact recommendation using the first connection information, the nearby user information for the first location, and the social networking information, wherein the second contact recommendation comprises a second proposed social networking connection between the first user and the third user. The connection information may further comprise a first amount of time that the first user is at the location based on the connection, wherein the connection discovery module further determines the first contact recommendation based on the first amount of time. For example, the first user may be previously associated with a second location based on a second amount of time that the first user is at the second location, wherein the first amount of time is greater than the second amount of time.

Figure 5:
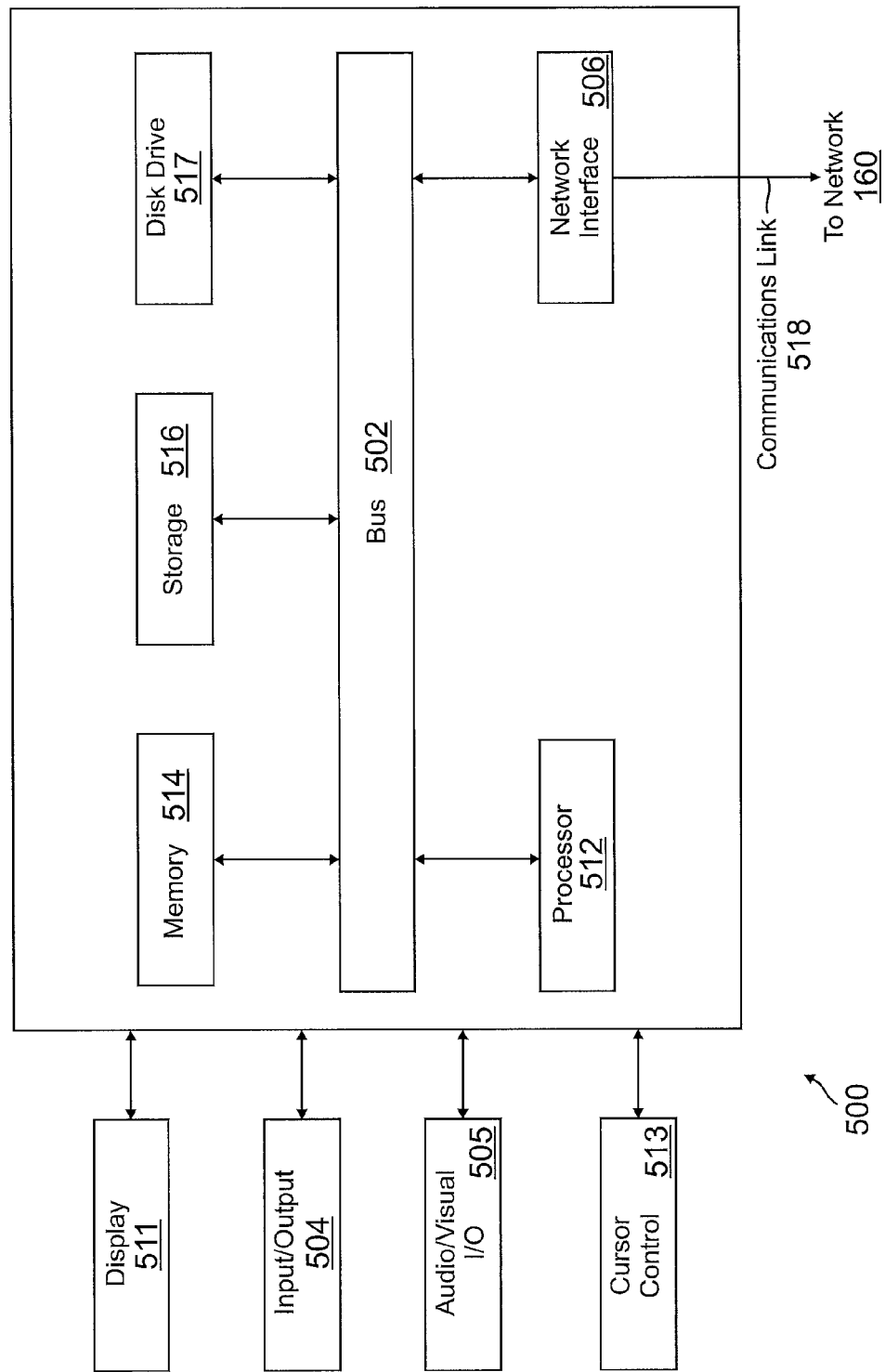
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory; and
one or more hardware processors coupled to the non-transitory memory and configured to read instructions from the non-transitory to cause the system to perform operations comprising:
accessing first connection information referencing at least one past instance of a first connection between a first communication device of a first user and a first device at a first location;
determining a frequency of visitations by the first user to the first location using the first connection information, wherein the frequency of visitations comprises a number of the visitations to the first location and a length of each of the visitations to the first location from the at least one past instance;
accessing location information for the first location, wherein the location information comprises a type of the first location;
determining that the first location is a work location of the first user using the frequency of the visitations and the location information;
in response to determine that the first location is the work location for the first user, accessing nearby user information for the first location comprising a second user associated with the first location based on second connection information referencing at least one second connection between a second communication device of the second user and the first device;
accessing social networking information comprising a first social networking contact for the first user and a second social networking contact for the second user; and
determining a first contact recommendation using the first connection information, the nearby user information for the first location, and the social networking information, wherein the first contact recommendation comprises a first proposed social networking connection between the first user and the second user.

2. The system of claim 1, wherein the at least one first connection uses one of near field communication, radio communication, infrared communication, Bluetooth communication, Bluetooth Low Energy (BLE) communication, WiFi communication, or LTE Direct communication.

3. The system of claim 1, wherein the first device comprises a wireless beacon at the first location.

4. The system of claim 1, wherein the second user is associated with the first location by being determined to be within a first distance to the first device during at least one past instance.

5. The system of claim 4, wherein the second user is determined to be within the first distance to the first device during at least one past instance based on the second connection information.

6. The system of claim 4, wherein the second user is determined to be within the first distance to the first device during at least one past instance using a check-in by the second user at the first location.

7. The system of claim 6, wherein the check-in comprises a GPS coordinate detection at the first location.

8. The system of claim 1, wherein the determining the first contact recommendation comprises determining that the first social networking contact for the first user and the second social networking contact for the second user were not previously connected on a social networking service.

9. The system of claim 1, wherein the operations further comprise:
providing the first social networking contact for the first user and the second social networking contact for the second user.

10. The system of claim 1, wherein the first connection information further comprises a first amount of time that the first user is at the first location based on the at least one first connection, and wherein the first contact recommendation is further based on the first amount of time.

11. The system of claim 10, wherein the first user is previously associated with a second location based on a second amount of time that the first user is at the second location, and wherein the first amount of time is greater than the second amount of time.

12. The system of claim 1, wherein the nearby user information further comprises a third user associated with the first location, wherein the social networking information comprises a third social networking contact for the third user.

13. The system of claim 12, wherein the determining is further based on a first social networking connection between the second social networking contact and the third social networking contact, wherein the operations further comprise determining that the first user is associated with the third user based on a second social networking connection between the first social networking contact and the third social networking contact, and wherein the first contact recommendation is further based on the first social networking connection and the second social networking connection.

14. The system of claim 12, wherein the operations further comprise:
 determining a second contact recommendation using the first connection information, the nearby user information for the first location, and the social networking information, wherein the second contact recommendation comprises a second proposed social networking connection between the first user and the third user.

15. A method comprising:
 receiving, via a communication module, connection information comprising at least one past instance of a connection between a first communication device of a first user and a device at a first location;
 determining a frequency of visitations by the first user to the first location using the connection information, wherein the frequency of visitations comprises a number of the visitations to the first location and a length of each of the visitations to the first location from the at least one past instance;
 accessing location information for the first location, wherein the location information comprises a type of the first location;
 determining that the first location is a work location of the first user using the frequency of the visitations and the location information;
 in response to determine that the first location is the work location for the first user, accessing, by a connection discovery module comprising at least one hardware processor, nearby user information for the first location comprising a second user associated with the first location, the second user associated with the first location based on second connection information referencing at least one second connection between a second communication device of the second user and the device at the first location;
 accessing, by the connection discovery module, social networking information comprising a first social networking contact for the first user and a second social networking contact for the second user; and
 determining, by the connection discovery module, a contact recommendation using the connection information, the nearby user information for the first location, and the social networking information, wherein the contact recommendation comprises a proposed social networking connection between the first user and the second user.

16. The method of claim 15, wherein the first user is previously associated with a second location, and wherein, prior to the accessing the nearby user information, the method further comprises:
 determining the first user is associated with the first location based on the connection information.

17. The method of claim 16, wherein the second location comprises a previous work location.

18. The method of claim 15 further comprising:
 providing the contact recommendation to at least one of the first user or the second user.

19. The method of claim 18 further comprising:
 generating a social networking connection between the first user and the second user based on an acceptance of the proposed social networking connection by at least one of the first user or the second user.

20. A non-transitory computer-readable medium comprising executable modules which, in response to execution by a computer system, cause the computer system to perform a method comprising:
 receiving, via a communication module, connection information referencing at least one past instance of a connection between a communication device of a first user and a device at a location;
 determining a frequency of visitations by the first user to the location using the connection information, wherein the frequency of visitations comprises a number of the visitations to the first location and a length of each of the visitations to the first location from the at least one past instance;
 accessing location information for the first location, wherein the location information comprises a type of the first location;
 determining that the first location is a work location of the first user using the frequency of the visitations and the location information;
 in response to determine that the first location is the work location for the first user, accessing, by a connection discovery module comprising at least one hardware processor, nearby user information for the location comprising a second user associated with the location, the second user associated with the location based on second connection information referencing at least one second connection between a second communication device of the second user and the device at the location;
 accessing, by the connection discovery module, social networking information for the first user and the second user; and
 determining, by the connection discovery module, a contact recommendation using the connection information, the nearby user information for the location, and the social networking information, wherein the contact recommendation comprises a proposed social networking connection between the first user and the second user.

* * * * *